United States Patent
O'Neill (10) Patent No.: US 12,490,750 B2
(45) Date of Patent: Dec. 9, 2025

(54) PROCESS FOR DRY AGING MEAT (71) Applicant: Saltbrick Retail, LLC, New York, NY (US)

(72) Inventor: Matthew Taylor O'Neill, Chicago, IL (US)

(73) Assignee: Saltbrick Retail, LLC, New York, NY (US)

(*) Notice: Subject to any disclaimer, the term of this patent is extended or adjusted under 35 U.S.C. 154(b) by 0 days.

(21) Appl. No.: 17/736,846

(22) Filed: May 4, 2022

(65) Prior Publication Data

US 2022/0354140 A1 Nov. 10, 2022

Related U.S. Application Data (60) Provisional application No. 63/184,619, filed on May 5, 2021.

(51) Int. Cl.
A23B 4/03 (2006.01)
A23B 2/53 (2025.01)
A23B 4/02 (2006.01)
A23L 13/00 (2016.01)

(52) U.S. Cl.
CPC ............. *A23B 4/031* (2013.01); *A23B 2/53* (2025.01); *A23B 4/02* (2013.01); *A23L 13/00* (2016.08)

(58) Field of Classification Search
CPC ........... A23B 4/031; A23B 4/02; A23B 4/015; A23L 3/28; A23L 13/00
See application file for complete search history.

(56) References Cited

U.S. PATENT DOCUMENTS 3,769,807 A * 11/1973 Foster ...................... F25D 3/11
62/380
7,998,517 B2 8/2011 Burke
2010/0310736 A1* 12/2010 Burke .................... A23B 4/015
426/418
2019/0209718 A1* 7/2019 Church ............... H01L 25/0753

FOREIGN PATENT DOCUMENTS

KR 200450516 Y1 * 10/2010

OTHER PUBLICATIONS

McHugh T, "Ozone Processing of Foods and Beverages," Nov. 1, 2015, retrieved May 2, 2023 [online]. From the internet <https://www.ift.org/news-and-publications/food-technology-magazine/issues/2015/november/columns/processing> (Year: 2015).*

(Continued)

Primary Examiner — Felicia C Turner
(74) Attorney, Agent, or Firm — Davis Wright Tremaine LLP (57) ABSTRACT A process for dry aging meat uses an enclosed, atmosphere controlled room with forced circulation and ultra-violet lighting, containing an anti-microbial meat aging rack with a salt brick stack covering one wall. Humidity is controlled to maintain between approximately 60 and approximately 65%. Temperature is controlled to maintain between approximately 32 degrees Fahrenheit and approximately 33 degrees Fahrenheit. UV lighting, some of which produces ozone, controls odors and sanitary conditions for the dry aging process.

6 Claims, 7 Drawing Sheets

(56) References Cited

OTHER PUBLICATIONS

Food Processing Technology.com, "UV Disinfection for Meat and Fish, Hanovia, United Kingdom," Jan. 5, 2010, retrieved May 4, 2023 [online]. From the Internet <https://www.foodprocessing-technology.com/projects/uvdissinfection/> (Year: 2010).*
Dimer UV, "Fundamental Properties of UV Disinfection Effectiveness," 2020, retrieved May 4, 2023 [online]. From the Internet <https://www.dimeruv.com/uvc-101/> (Year: 2020).*
Ultra-Fresh, "Antimicrobial Coatings," 2019, retrieved May 4, 2023 [online]. From the Internet <https://www.ultra-fresh.com/antimicrobial-applications/antimicrobial-coatings> (Year: 2019).*
KR200450516 (Year: 2010).*
Lee et al. KR 2013002467 2013 (Year: 2013).*
Cho WO 2019112094 (Year: 2019).*
Wang CN 203824216 Sep. 2014 (Year: 2014).*

* cited by examiner

PROCESS FOR DRY AGING MEAT

CROSS-REFERENCE TO RELATED APPLICATIONS

The present application claims priority to U.S. Provisional Application No. 63/184,619, entitled "PROCESS FOR DRY AGING MEAT," filed on May 5, 2021, the entire contents of which is hereby incorporated by reference for all purposes.

BACKGROUND

Dry aging breaks out enzymes in the meat and makes it more flavorful and tender. Unlike wet-aging, where the pieces of meat are sealed in a plastic wrapping and aged from the inside out in a short period of a few days at most, the far more expensive dry aging process exposes the surface of the meat to the atmosphere in an aging room and aging occurs from the outside in. Dry aging generally takes from two to four weeks but tangy flavor is enhanced further by aging for up to 35 days. Aging periods of longer than 35 days, however, have been considered to be impractical since a piece of meat aged for so long would be expected to be unusable.

As dry aging progresses the outer surface of the meat becomes discolored and hard, and must eventually be removed to expose the usable, flavorful core. Accordingly cost increases even further due both to the long time needed for the dry aging process, and also due to the large amount of weight loss between the original piece of meat and the remaining usable cut that has lost moisture and also lost its outer hard covering. A need remains for improving the dry aging process allowing for longer aging periods while minimizing weight loss.

BRIEF DESCRIPTION OF THE DRAWINGS

Various techniques will be described with reference to the drawings, in which.

DETAILED DESCRIPTION

The present disclosure relates generally to the field of food preparation, and in particular to a new and useful process for aging meat that allows the meat to be aged for a longer period to enhance its tenderness and flavor, while avoiding excessive spoilage and waste.

An objective of the present disclosure provides a process for dry aging meat that uses an enclosed, atmosphere controlled room with forced circulation containing a salt rack with a salt brick stack covering one or more walls. An enclosed, temperature and humidity controlled aging room may include a pair of spaced apart longer length walls each with a height, a pair of spaced apart shorter width walls each with similar height, a floor and a ceiling, enclosing a volume for containing an aging atmosphere.

The temperature and the humidity of the aging atmosphere in the aging room may be controlled to be within selected temperature and humidity ranges. The temperature may be controlled be within approximately 32 to approximately 35 degrees Fahrenheit, wherein daily variation of the temperature may be controlled to be less than approximately 1 degree Fahrenheit. The humidity may be controlled to be within approximately 60-65%. A dehumidifier may control the variation of humidity to vary less than 1% daily. The meat aging room may be controlled to maintain an average temperature of approximately 32 degrees Fahrenheit with approximately 60% humidity. Varying the humidity depending on the season may mitigate condensation in the aging room. For example, by increasing the humidity by 10 points in the Spring when the ambient temperature outside starts to go above 41 degrees Fahrenheit regularly, helps to control condensation in the warmer months compared to colder months when the outside temperatures are colder than the aging room. Such varying of the humidity helps to keep the aging room climate more stable.

The salt rack may occupy a substantial portion of the length and height of one of the length walls of the room. The salt rack may be spaced away from the one wall of the room to facilitate circulation of the atmosphere around the stack of bricks. A salt rack may support or carry an ordered stack of a multiplicity of salt bricks. The salt rack may comprise antimicrobial properties. The salt rack may be coated with an antimicrobial product, such as a Microban® product.

A salt brick may be of a narrow width compared to its length for increased surface area. Each brick may have an average height of about 2 inches, an average width of about 4 inches, an average length of about 8 inches, and an average weight of about 3.10 pounds. The stack of salt bricks may substantially cover one wall of the room, providing for an increased surface area to volume of the stack in the aging atmosphere relative to other dimensions. The total weight of salt bricks in the room may be proportionally adjusted as meat pieces are added or removed from the room. The total weight of salt bricks in the room may be set to approximate 1 pound of salt per cubic foot of the room.

The bricks may be orderly arranged in rows that are stacked row-upon-row in one layer of bricks on the plastic rack. The salt bricks in each row may be offset to the side by one half a brick length with respect to the next row, stacked in place by gravity. The salt bricks may fuse together due to moisture in the room. The stack of salt bricks may be tilted back within a given salt rack against a wall of the room to help prevent upsetting the stack of salt bricks, for example, while meat pieces are being loaded onto meat racks in the room, or unloaded from the meat racks after aging.

A plurality of unwrapped and uncovered meat pieces may be loaded onto a meat rack in the room that is spaced apart from the salt rack. A plurality of meat racks may be located in the aging room. A meat rack may be located between the stack of salt bricks along one length wall and the other the length wall. Various meat racks may be distributed at various distances away from the salt rack.

The meat racks may be arranged around the aging room in a respective plurality of aging locations according to a dry aging process. The meat pieces may be moved from remote locations spaced furthest from the salt rack, to intermediate locations that are closer to the salt rack, to proximal locations that are along the salt rack. Locations of the distributed meat racks may correspond to a timed cycle of days that is a fraction of the total number of days for aging.

Ultraviolet (UV) lights may be distributed throughout the aging room. The UV lights may comprise ozone producing UV lights and non-ozone producing UV lights. Half of the UV lights may be ozone producing UV lights. Ozone producing UV lights may neutralize odors in the aging room.

Throughout the dry aging process, atmosphere in the aging room may be forcibly circulated around the meat racks and the salt racks. Airflow may be concentrated in the middle of the aging room such that return air blows over the sides of the room.

The meat pieces may be moved to progressively closer meat rack locations relative to the salt rack. A first time cycle for a first plurality of meat pieces at an introductory location may correspond to a fraction of the total selected number of days for the dry aging. After the passage of the first time cycle, the first plurality of meat pieces may be an intermediate location for a second time cycle corresponding to a fraction of the total selected number of days for the dry aging. After the passage of the second time cycle, the first plurality of meat pieces may be moved to one of the proximal locations that are along the salt rack for a third time cycle corresponding to a fraction of the total selected number of days for the dry aging. After the passage of the third time cycle, the first plurality of meat pieces may be removed from the aging room for use. The total of all of the time cycles are equal to the selected number of days of dry aging for the first plurality of meat pieces. That is, after an expiration of the total selected number of days for the dry aging process, the meat pieces may be removed from the aging room for use.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments are capable of achieving certain advantages, including some or all of the following: (1) allowing dry aged meat to be viable beyond 70 days of dry aging, (2) minimizing deterioration of dry aged meat, and (3) extending the dry aging process for more than 130 days.

Figure 1:
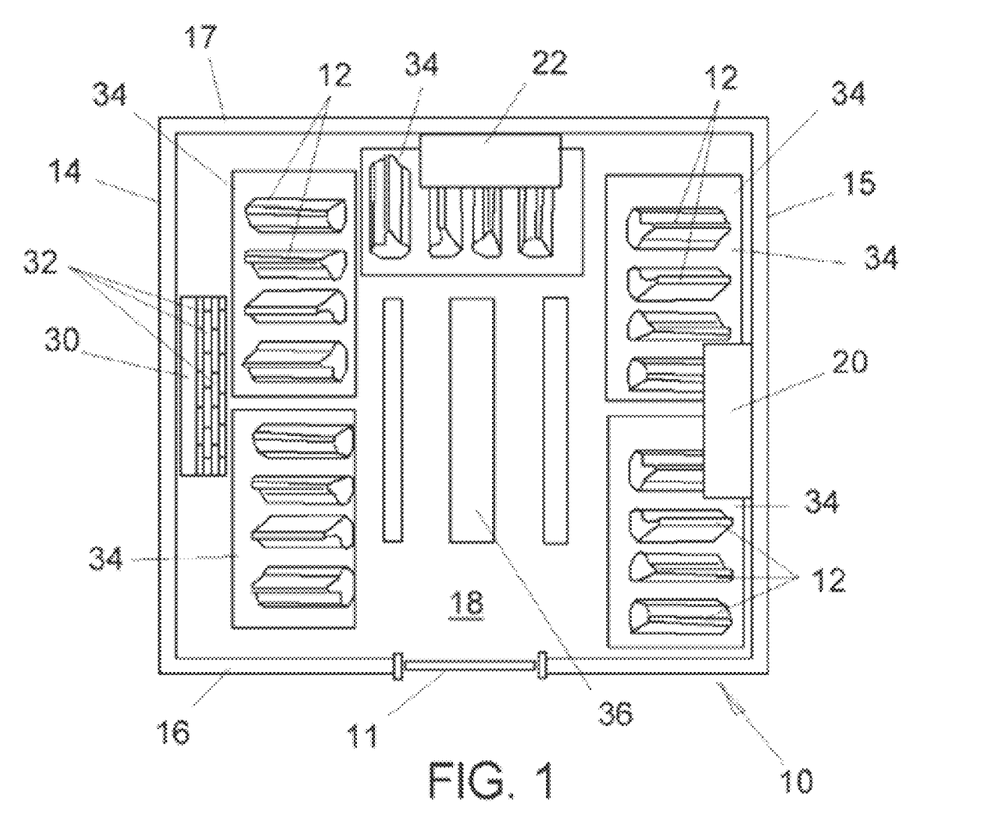
FIG. 1 is a schematic, top plan view of a meat aging room.

Referring now to the drawings, in which like reference numerals are used to refer to the same or similar elements, FIG. 1 schematically illustrates a Chicago process for dry aging meat pieces 12 in an aging room for a selected number of days and which utilizes an enclosed, temperature and humidity controlled aging room 10 having a pair of spaced apart and insulated side walls 14 and 15, a pair of spaced apart and insulated end walls 16 and 17, a floor 18 and a ceiling, for enclosing a volume for containing an aging atmosphere. The temperature and the humidity of the aging atmosphere in the aging room are controlled to be within selected temperature and humidity ranges by a refrigeration unit 20 and a humidifier 22 which also contains fans for forcibly circulating the atmosphere in the aging room around meat racks and a salt rack in the room volume.

Varying the humidity depending on the season may reduce excess accumulation of moisture, such as due to condensation, in the aging room. For example, in the Spring when the ambient outdoor temperature begins to average 41 degrees Fahrenheit or more regularly, the humidity in the aging room may be increased by 10 points relative to a humidity baseline set in the Winter. By increasing the humidity of the aging room in the warmer months, condensation in the aging room may be reduced. Humidity of the aging room may then be reduced in colder months when the outside temperatures are colder than the aging room, such as reducing the humidity by 10 points. An advantage of varying of the humidity in the aging room is to maintain the aging room climate and reduce excess accumulation of moisture, such as due to condensation.

Along part of the length and part of the height of one of the side walls 14, a plastic salt rack 30 is provided and carries an ordered stack of a multiplicity of salt bricks 32, each salt brick in the stack being preferably a brick of Himalayan salt.

A plurality of multi-shelved food grade meat racks 34 are arranged in the aging room 10 and are spaces between the stack of bricks on rack 30 near wall 14, and the other one of the side walls 15. To practice the process, the meat pieces 12 are weighed, tagged with the weight and date and loading through a door 11 in end wall 16, onto a meat rack 34 in the room 10 in an unwrapped and uncovered state so that the surface of the meat is exposed directly to the aging atmosphere. After the passage of a total selected number of days for the dry aging process, the aged pieces of meat are removing from the aging room. For their entire stay in the aging room 10, each meat piece 12 remains at the same location.

Other fixtures in the aging room are one or more fluorescent lights 36 on the ceiling and/or walls of the room 10 for ambient lighting during the day or during business hours, and one or more ultraviolet (UV) or black light (not shown in FIG. 1) on the walls and/or ceiling of the room that are turned on when the ambient lights 36 are turned off to help maintain a sanitary condition in room 10 by killing, or at least reducing microbes in the atmosphere.

Chicago Parameters:
  Salt-Room Dimensions (Feet): 12 wide×16 long×8 high
  Relative Humidity:
    Range: 60%-65%
  Temperature (Fahrenheit):
    Range: 32-35° F.
    Preferred Range: 32-33° F.
  Aging Time (Days):
    Range: 7-70
    Preferred Range: 28-55
  Air Circulation (Linear Feet Per Minute):
    Range: 15-20 LFM
    Preferred Range: 15-20 LFM
  Salt-Brick Dimensions (Inches):
    Average Height: 4
    Average Width: 2
    Average Length: 8
  Brick Average Weight (Pounds): 3.10
  Number of Bricks in Rack: 153.

The salt rack in Chicago is plastic as mentioned above and the ratio of salt to meat in the aging room by weight is 1:4 of about 25% salt weight per weight of meat being aged. The individual pieces of meat which, for beef, are generally in the range of about 20 to 40 pound each initially, are not moved during the aging process in the Chicago method, but instead are placed on a selected meat rack 34 for the entire aging period.

After experimenting with various aspects of the Chicago aging room and process, and with his understanding of the various dynamics that take place during the dry aging process, the inventor has discovered that, unexpectedly to him and to others of ordinary culinary skill, the already long dry aging period can be extended even further with slowed decay rates and enhanced flavor and tenderness.

Firstly the inventor has found that if the pieces of meat are rotated to different positions in the aging room, starting first on a meat rack furthest from the salt rack when the meat pieces are first weighed, dated and placed in the room, and then moved to meat racks that are progressively closer to the salt rack on a rotation cycle of, for example 5 days, that the aging process can be extended to 40 days or even 70 days, without excessive decay in or on the meat pieces, and with very discernable improvement in flavor and tenderness over the 35 day aged meats, or example of the Chicago process.

The inventor also discovered that replacing the plastic salt rack with a stainless steel salt rack for carrying the stack of Himalayan salt bricks, unexpectedly improved the flavor even further.

In addition, the inventor has found that by using a thinner stack of salt bricks and by using more weight of salt per weight of meat, the increased surface area exposed to the conditioned atmosphere in the aging room further extends the number of days the meat can be aged. He found that by reducing the average brick width from 2 inches to 1 or 1.5 inches, and by considerably increasing the weight of salt bricks in the room to a salt-to-meat weight ratio of above about 1:3 or preferably about 1:2, that is, about 50% salt weight per weight of meat being aged, the resulting aging time and flavor results are improved further. A preferred range is about 40% to about 60% salt weight to meat weight in the room, by weight.

To further advance the exposure of the meat to the salt ladened atmosphere, especially during the latter period of the total aging process when the meat pieces are closest to the salt stack during successive rotation cycles, the inventor found it most advantageous to extend the stack of salt bricks along substantially all of one of the longer walls of the aging room, and substantially from the floor to the ceiling of the wall.

The inventor believes that by increasing the overall salt content of the aging room atmosphere by providing more salt, and by exposing the meat to a lower level of salt during the early days of aging, when spoilage is less likely to occur, but then increasing this exposure during the latter days when the likelihood of spoilage as increased, by moving the meat piece along the salt covered wall, maximum aging and flavor building occurs with minimum spoilage.

Following are the preferred parameters for the process of the present disclosure that the inventor has researched and perfected at his restaurant "David Burke Prime" at Foxwoods Resort Casino in Connecticut, all within twelve month of the filing date this patent application.

Foxwoods Parameters
   Salt-Room Dimensions (feet): 10 wide×18 long×8 high
Relative Humidity:
   Allowable Range: 59%-65%
   Preferred Range: 59%-61%
Temperature (Fahrenheit):
   Allowed Range: 32-35
   Preferred Range: 32-33
Aging Time (Days):
   Range: 7-70
   Preferred Range: 28-55
Air Circulation (Linear Feet Per Minute):
   Range: 15-20 LFM
   Preferred Range: 15-20 LFM
Salt-Brick Dimensions (Inches):
   Average Height: 2 (preferred 1.5-4.5)
   Average Width: 1.5 (preferred 1-2)
   Average Length: 8 (preferred 4-9)
Brick Average Weight (Pounds): 1.63 (1.5 to 2.0)
Number of Bricks in Rack: 500 to over 1000.

While most widely usable for aging beef, the principles of the dry aging process can be applied to other meats such as lamb, pork, bison, game animals like deer and elk, or other edible meats.

Figure 2:
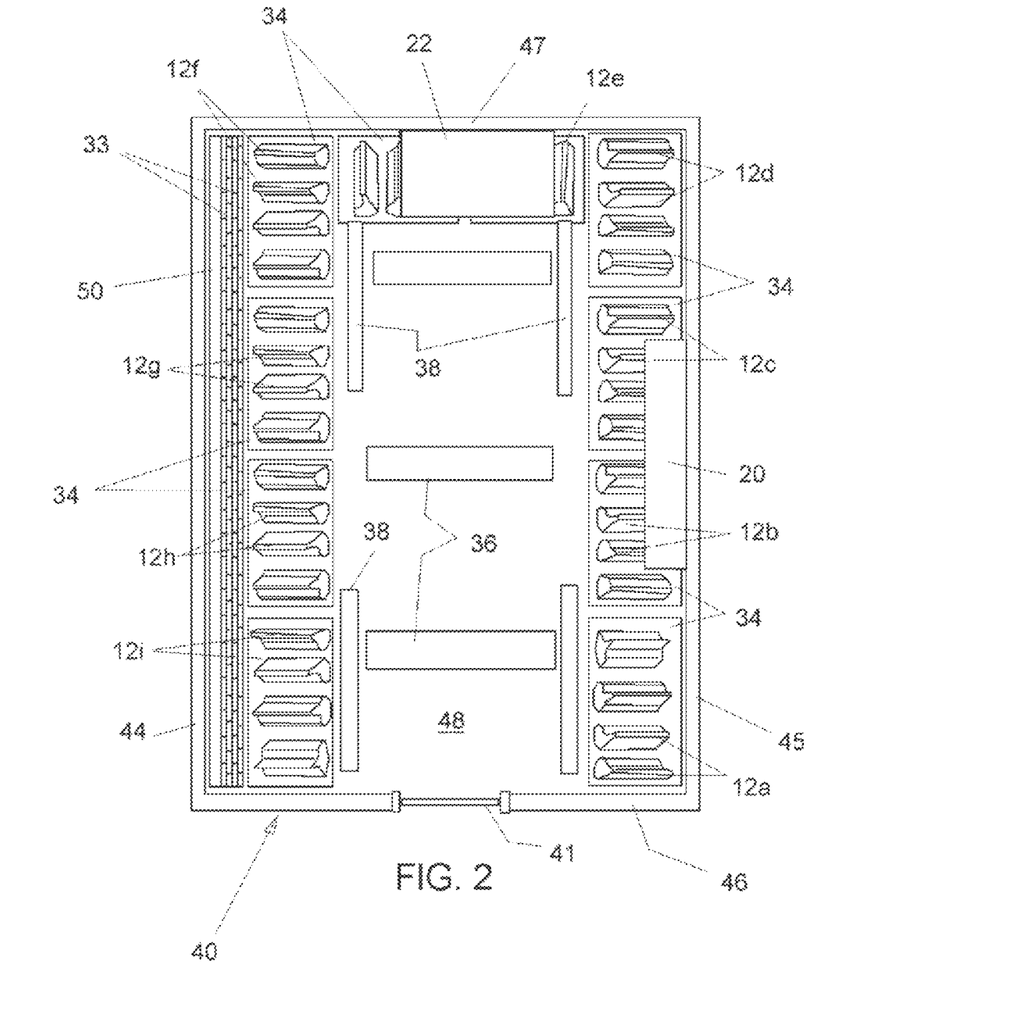
FIG. 2 is a schematic, top plan view of a meat aging room according to an embodiment.
Figure 3:
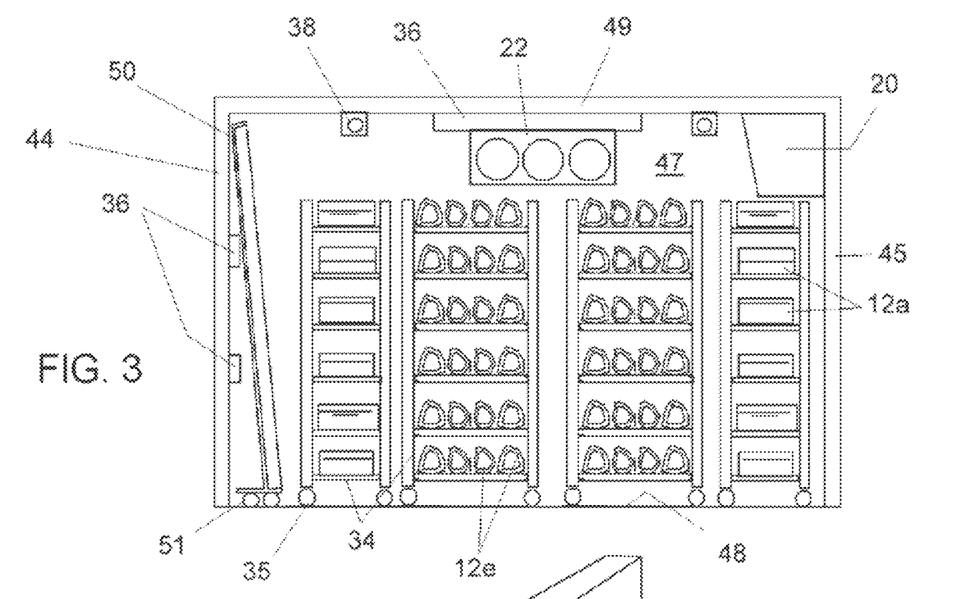
FIG. 3 is a side sectional view of the meat aging room of FIG. 2.

Turning to FIGS. 2 and 3, these figures schematically illustrate the process developed at Foxwoods and embodying the current disclosure for dry aging multiple pluralities of unwrapped and uncovered meat pieces 12 a to 12 i, in an aging room 40 for a selected number of days, and which utilizes an enhanced and enclosed, temperature and humidity controlled aging atmosphere.

Room 40 has a pair of spaced apart and insulated longer length walls 44 and 45, of about 18 feet for example, each with a height of about 8 feet for example, a pair of spaced apart and insulated shorter width walls 46 and 47, of about 10 feet for example, each with the same height, a floor 48 and a ceiling 49, for enclosing a volume for containing the aging atmosphere. The temperature and the humidity of the aging atmosphere in the aging room are controlled to be within selected temperature and humidity ranges by a refrigeration unit 20 and a humidifier 22 which also contains fans for forcibly circulating the atmosphere in the aging room 40, around meat racks and the salt rack in the room volume.

Along substantially all of the length and height of one of the length walls 44, a stainless steel salt rack 50 is provided for carrying an ordered stack of a multiplicity of salt bricks 33. Each salt brick 33 in the stack has a narrow width, of preferred 1 to 2 inches, compared to its length of about 4 to 9 inches and its height of about 2-5 inches. Each brick has an average weight of about 1.5 to 2.0 pounds and there are about 500 to over 1000 bricks in the salt rack 50. As best shown in FIG. 3, the salt rack 50 carries the bricks 33 in a tilted back manner toward the wall 44, from the bottom to the top of the wall, and is spaced from the wall 44 by about 1 foot at the bottom and less at the top for allowing circulation of the atmosphere around the stack of bricks. The inventor has found that the stainless steel salt rack 50 adds no flavor to the meat as other materials might, and has placed the salt rack on rollers 51 so that the entire rack can be moved in the room and removed from the room for loading and unloaded of the brick which, over time in the room, slowly resolve into the aging atmosphere and must eventually be replaced.

A plurality of multi-shelved, food grade meat racks 34 are arranged in the aging room 40, and are spaces between the stack of bricks 50 and the other one of the length walls 45. Meat racks 34 are on rollers 35 so that they can be moved into and out of the room for loading, unloading and cleaning, and so that they can be moved to various locations in the room as will be explained below. The meat racks 34 are arranged around the aging room 40 at a respective plurality of aging locations from a remote location for meat pieces 12 a to the right of the door 41 in FIG. 2, that is spaced furthest from the salt rack 50, to intermediate locations for meat pieces 12 e along the opposing short width wall 47, that are progressively closer to the salt rack, to proximal locations for meat pieces 12 *f* to 12 *i* that are along the salt rack 50.

According to the method of the disclosure, a first plurality of unwrapped and uncovered meat pieces 12 *a* to be dry aged, are weighed, and tagged with the weight and date and then loaded onto the meat rack 34 at the most remote location from the salt rack 50, and nearest the door 41. This first plurality of meat pieces 12 *a* is them left at this remote location for a first time cycle corresponding to a fraction of the total selected number of days for the dry aging, for example, for 5 of the 40 day total that is contemplated of the meat pieces 12 *a*.

After the passage of the first time cycle of e.g. 5 days, the meat pieces 12 *a* are moved either to a next meat rack 34 at 12 *b*, along wall 45 that can also be considered to be an intermediate location, or to the location 12 *e* long the opposing wall 47 and left there for the next 5 day time cycle, again corresponding to a fraction of the total number of days for the dry aging process. After the passage of this second time cycle, the meat pieces are gain moved, e.g. to one of the proximal locations 12 *f* that are along the salt rack 50. They are left there for a third time cycle corresponding to a fraction of the total selected number of days for dry aging and, after the passage of the third time cycle, removed from the aging room through door 41 of use.

As each of the plurality of meat pieces is moved from location to location, ever closer, or at least not further from the rack 50, and then along the rack, a new plurality of meat pieces replaces them so that a continuous rotation of sets of the meat pieces progress into the room, move along the walls from remote to proximal, and then move out of the room on a cyclic basis, after the total number of days have elapsed. Movement of the multiple pluralities of meat pieces can be achieved by moving the pieces from meat rack to meat rack, or by rolling an entire meat rack 34 with the selected plurality of meat pieces to the next aging location around the walls of aging room 40.

As in the Chicago process, other fixtures in the aging room are one or more fluorescent lights 36 on the ceiling and/or walls of the room 10 for ambient lighting during the day or during business hours, and one or more ultraviolet (UV) or black lights 38 on the walls and/or ceiling of the room that are turned on when the ambient lights 36 are turned off to help maintain a sanitary condition in room 10 by killing or at least reducing microbes in the atmosphere. Especially attractive for the appearance of the aging room are florescent lights 36 on the length wall 44, behind salt rack 50, that illuminate the stack of translucent pink or Salmon colored Himalayan bricks 33 from behind. The interior of the aging room 40 is visible from outside through windows (not shown) so that patrons of the restaurant can see the dry aging process in operation.

Figure 4:
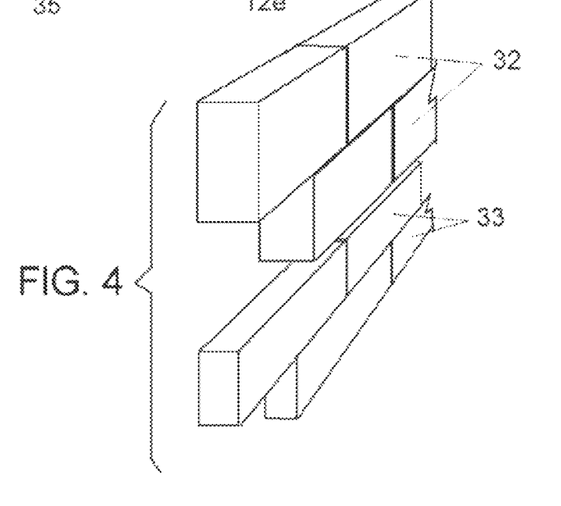
FIG. 4 is a comparative view of the average brick size and arrangement of a Himalayan salt brick stack according to an embodiment.

FIG. 4 compares the relatively thicker bricks 32 in the ordered stack of the Chicago salt rack at the top, to the relatively narrower and generally small bricks 33.

The longer the duration of time that the meat remains in the salt aging box, the salt adds further seasoning and begins to permeate the flavor of the meat. According to the present disclosure, the aging period can be extended more reliably and with more likelihood that the aged piece of meat will still be usable at the end of the period. According to the present disclosure, 120 day aged meat is more often usable and enhanced meat.

In some embodiments, the weight of salt kept in the drying room may be based on the cubic volume of the room. For example, one pound of salt may be kept in the drying room for each cubic foot of volume within the drying room. A drying room of approximate dimensions 10'×18'×8' would indicate that, in at least one example, approximately 1400 pounds of salt would be kept in the drying room.

Figure 5:
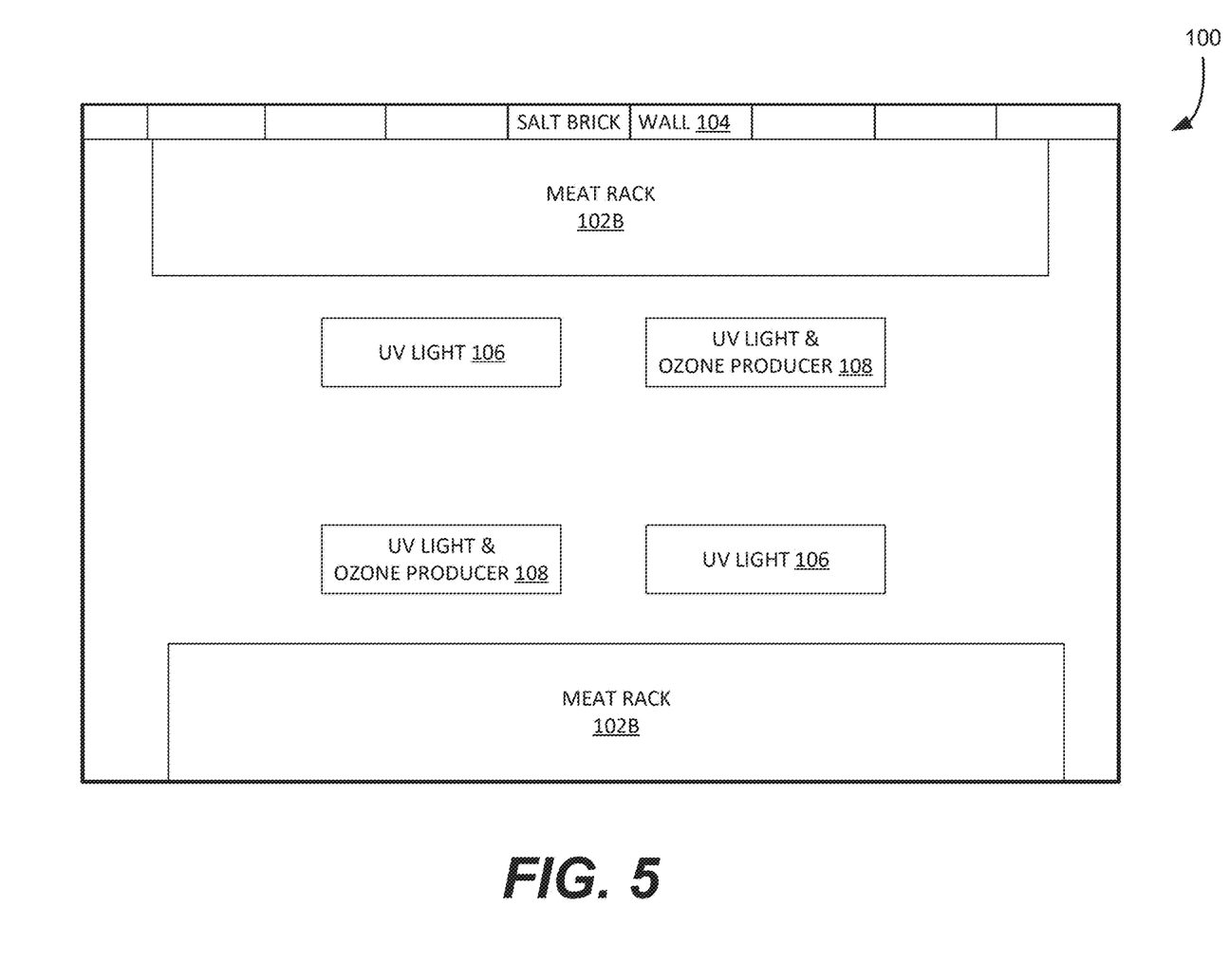
FIG. 5 is a top plan view of a meat aging room indicating placement of ultra-violet lights and ozone producers according to an embodiment.

FIG. 5 is a top plan view of a meat aging room 100 indicating placement of ultra-violet (UV) lights 106 and combination UV light & ozone producers 108 according to an embodiment. As described above in reference to FIGS. 2-4, a meat rack 102 may be positioned along a length of wall. In an embodiment, a meat rack 102A may be positioned along a length of the meat aging room 100 where a salt brick wall 104 is also positioned. A meat rack 102B may be positioned along a length of the meat aging room 100 opposite where the salt brick 104 is positioned. UV lights 106 may be positioned between the meat racks 102A and 102B.

UV lights 106 may be light fixtures including one or more UV light-producing bulbs that do not produce ozone. For example, UV lights that output light wavelength from approximately 240 nm to 315 nm (middle wave UV, "UV-B") do not form ozone. A UV light for destroying ozone may be tuned to output at approximately 254 nm wavelength. Long wave UV light, "UV-A," with a wavelength between approximately 315 nm and 400 nm does not substantially impact oxygen molecules. UV lights 106 may output UV-A light. Examples of UV lights 106 include bulbs with peak UV output at approximately 253.7 nm of approximately 16 W and an intensity at 1 m of approximately 150 $\mu$W/cm$^2$, such as the American Ultraviolet Germicidal lamp GML090.

Combination UV light and ozone producers 108 may also be positioned between the meat racks 102A and 102B. A UV light and ozone producer 108 may be orientated adjacent to a UV light 106, such that the meat aging room 100 is configured with an alternating arrangement of UV lights 106 and combination UV light and ozone producers 108. Combination UV light and ozone producers 108 may be light fixtures including one or more UV light-producing bulbs that also produce ozone. For example, UV lights that output light wavelength from approximately 100 nm to 240 nm (short wave UV, "UV-C") disrupt the bond of oxygen molecules wherein the oxygen atoms reconfigure to form ozone. A UV light producing ozone may be tuned to output at approximately 185 nm wavelength. UV light and ozone producer 108 may output UV-C light. Examples of combination UV lights and ozone producers 108 include bulbs with peak UV output at approximately 253.7 nm of approximately 16 W, UVC output of approximately 13 W, and an intensity at 1 m of approximately 150 $\mu$W/cm$^2$, such as the American Ultraviolet Germicidal lamp GML005.

UV lights 106 and UV lights and ozone producers 108 may be distributed throughout the aging room 100. In an embodiment, a plurality of UV lights 106 and UV lights and ozone producers 108 may be distributed along a central width of the aging room 100. For example, UV lights 106 and UV lights and ozone producers 108 may be orientated in a row or grid relative to a central width of the aging room 100. In an embodiment, a UV light 106 may be laterally adjacent to a UV light and ozone producer 108. In an embodiment, a grid of UV lights may be distributed such that a UV light 106 is adjacent to one or more UV light and ozone producers 108, either on one or more sides, front, back, or a combination thereof. UV lights 106 and/or UV light and ozone producers 108 may be stacked vertically. In an embodiment, a vertical stack may include an alternating arrangement of UV lights 106 and UV light and ozone producers 108. A quantity of UV lights 106 may match a quantity of UV light and ozone producers 108 in a row, grid, stack, the aging room 100, or a combination thereof.

Figure 6:
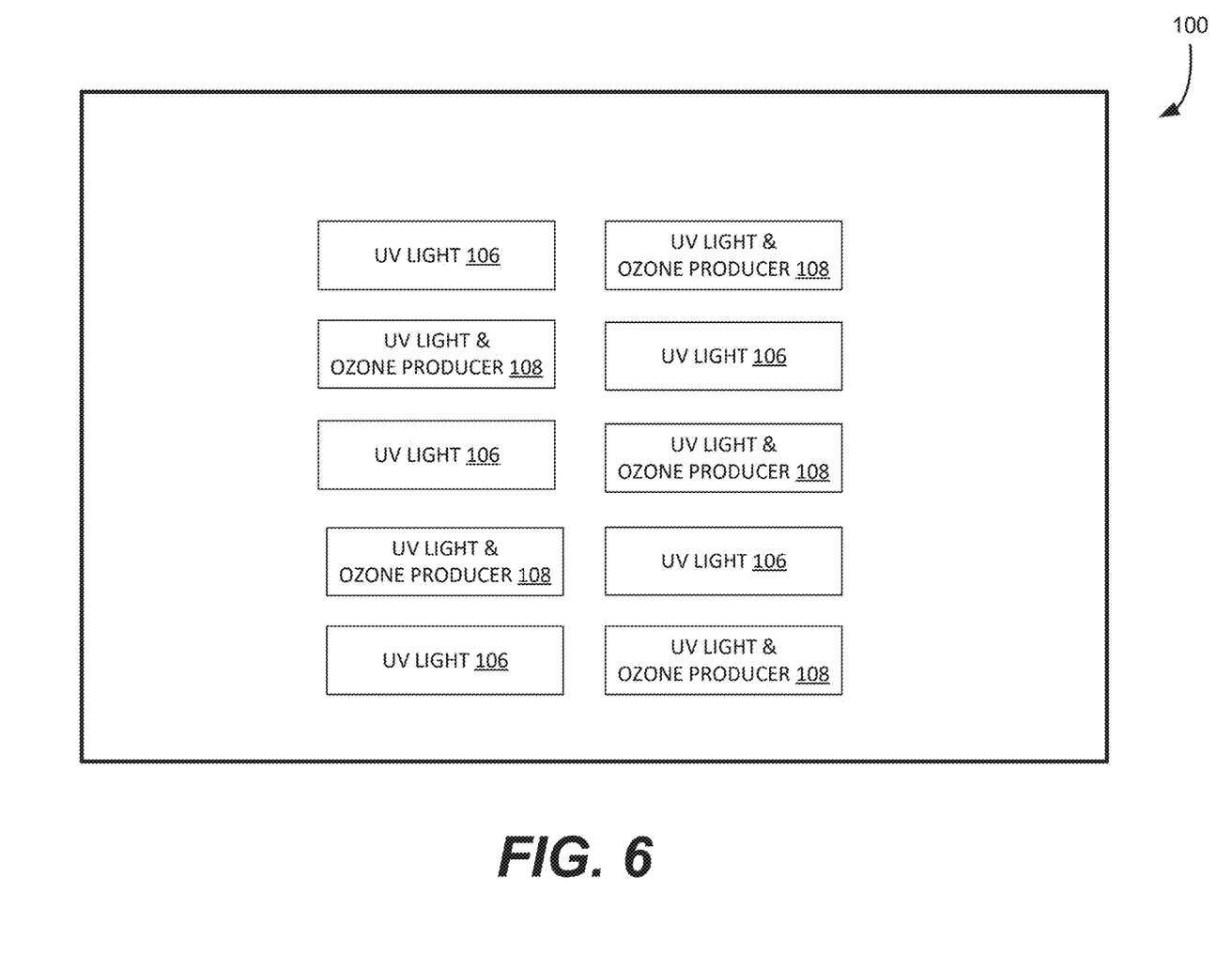
FIG. 6 is a side view of a meat aging room indicating placement of ultra-violet lights and ozone producers according to an embodiment.

FIG. 6 is a side view of a schematic of the meat aging room 100 according to an embodiment, such as being consistent with FIG. 5. On opposite sides of the meat aging room 100, a UV light 106 may be orientated opposite of a UV light and ozone producer 108. A series of vertical lights may include a combination of two or more UV light 106 and/or UV light and ozone producer 108. As lights may be orientated vertically, a series of vertical lights may include, as a non-limiting example, an alternating pattern of a UV light and ozone producer 108, then a UV light 106, then a UV light and ozone producer 108, etc. A vertical orientation of lights may begin with a UV light 106 or a UV light and ozone producer 108. A vertical orientation of lights may begin at approximately a height corresponding to the lowest meat rack and extend vertically to another height corresponding to the highest meat rack.

Half of UV lights in the room may be ozone producing and half of the UV lights in the room may not be ozone producing. In an embodiment, the meat aging room 100 includes one UV light and ozone producer 108 for each UV light 106 in the room. In an embodiment, the meat aging room 100 include two stacks of UV lighting for each meat rack 102. A first stack of UV lighting begins with a UV light 106 closest to the ground while a second stack adjacent to the first stack begins with a UV light and ozone producer 108.

Figure 7:
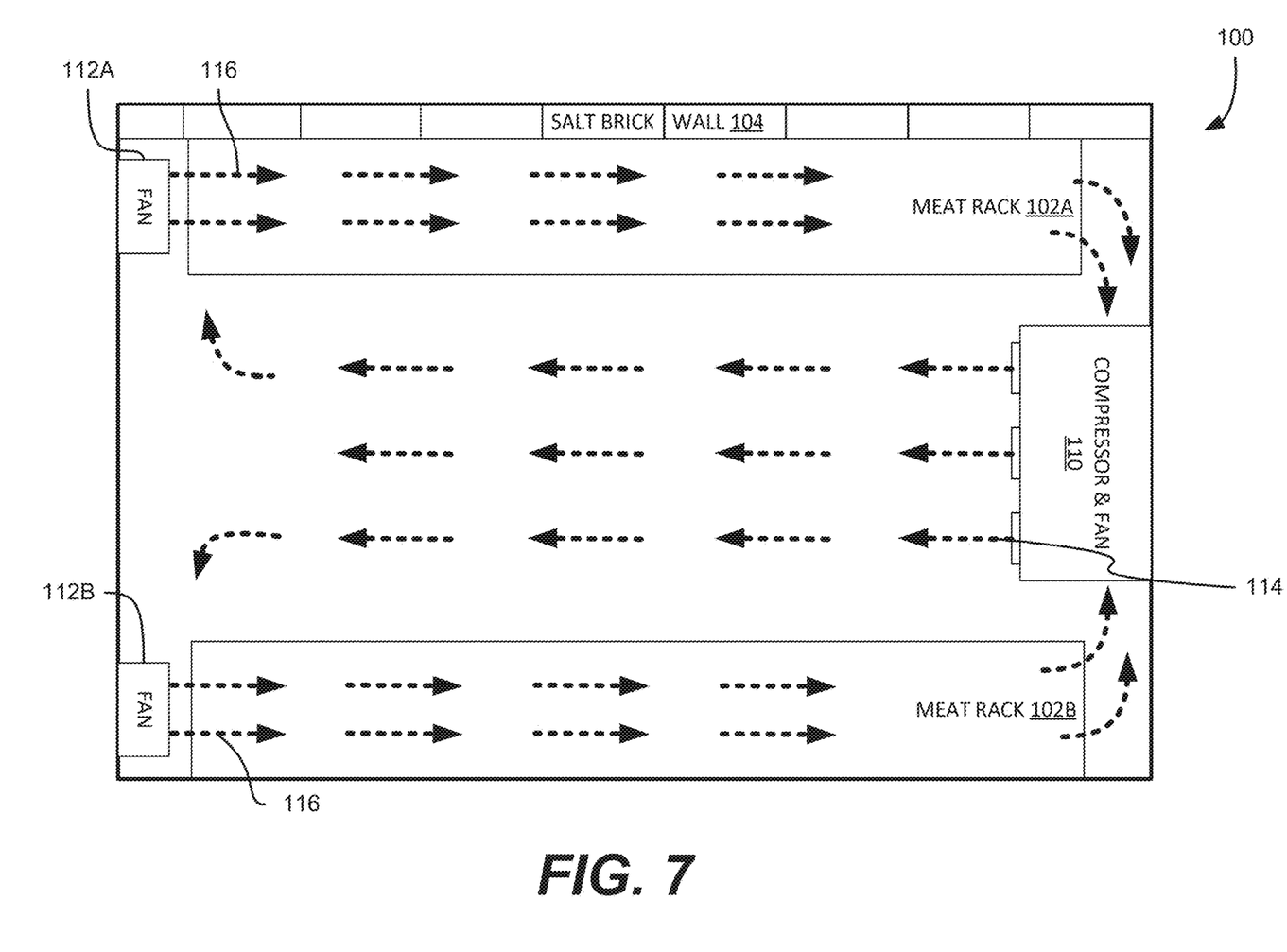
FIG. 7 is a top plan view of a meat aging room indicating placement of fans and at least one compressor that induce airflow about the meat aging room.

FIG. 7 is a top plan view of a meat aging room 100 indicating an orientation of a combination fan and compressor 110 and fans 112 according to an embodiment. A combination compressor and fan 110 may be orientated along a side of the meat aging room 110 that intersects another side of the meat aging room 100 parallel to the salt brick wall 104. The compressor and fan 110 may also be orientated along a side of the meat aging room 110 shared by the salt brick wall 104 or opposite said side. The compressor and fan 110 may be orientated at a substantially central position relative to a width of the meat aging room 100. The compressor and fan 110 may be mounted to a ceiling and/or side of the meat aging room 100.

The compressor and fan 110 may intake air to adjust humidity of said air. The compressor and fan 110 may induce humidity adjusted air to flow 114 away from the compressor and fan 110 and towards a fan 112 placed at an opposing side of the meat aging room 100. In an embodiment, the compressor and fan 110 includes three fan assemblies, though one skilled in the art will appreciate that one or more fans may be included in the compressor and fan 110. The compressor and fan 110 may be a humidity controlling device, such as a dehumidifier. A dehumidifier may include components of a fan, a compressor, refrigerant, a condenser, an evaporator, a heating element, and/or storage for water.

In an embodiment, the compressor and fan 110 accepts a signal from a temperature sensor. As a result of the temperature indication, the compressor and fan 110 may adjust the temperature of air within the meat aging room by inducing airflow over a heating element or condenser until a target temperature, or temperature range, is achieved. For example, the temperature may be controlled so as to maintain 32-33 degrees Fahrenheit. The compressor and fan 110 may accept a signal from a humidity sensor. As a result of the humidity indication, the compressor and fan 110 may adjust the humidity of the air within the meat aging room by inducing airflow over a condenser or water storage until a target humidity, or humidity range, is achieved. For example, the humidity may be controlled so as to maintain 60-65% humidity.

The compressor and fan 110 may be orientated at a height substantially similar to the height of a shelf of the meat rack 102, such as the top shelf. In some embodiment, an individual fan of the compressor and fan 110 is orientated to correspond to a height of each individual shelf of the meat rack 102. The compressor and fan 110 may be orientated above or below a top shelf of the meat rack 102.

At least one fan 112 may be orientated substantially in-line with a length of a meat rack 102. In an embodiment, a fan 112A on an opposite side of the meat aging room 100 from the compressor and fan 110 may intake ambient air and induce the air to flow 116 away from the fan 112 and towards the compressor and fan 110. In an embodiment, a fan 112 may be orientated along a side of the meat aging room 100 that intersects with the side in which the compressor and fan 110 is mounted.

In an embodiment, an individual shelf of the meat rack 102 includes an antimicrobial coating. For example, an antimicrobial coating of Microban® may be applied to a shelf of the meat rack 102. Meat may be stored on one or more meat racks similar to meat rack 102. In an embodiment, beef may be stored on a meat rack 102.

Figure 8:
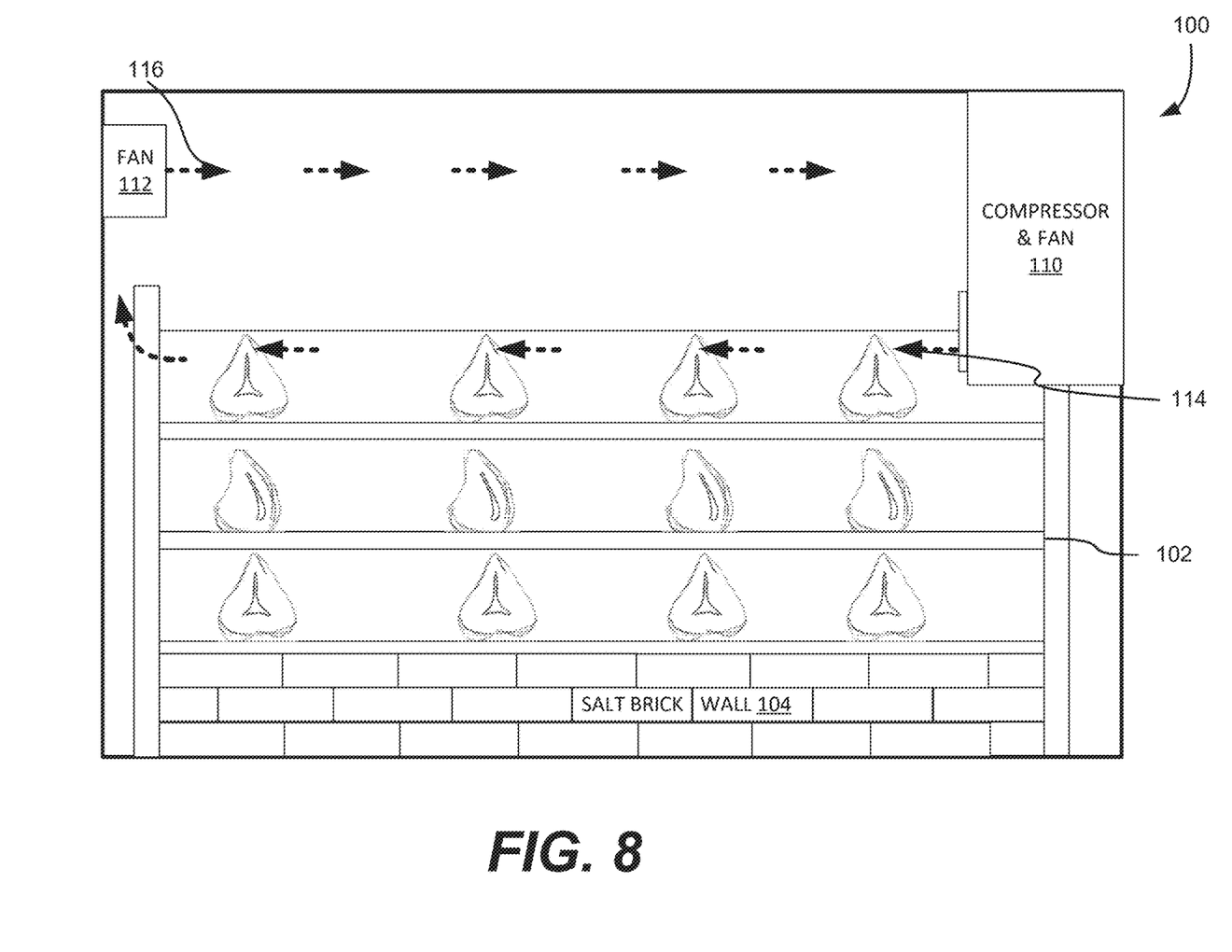
FIG. 8 is a side view of a meat aging room indicating placement of fans and at least one compressor that induce airflow about the meat aging room.

FIG. 8 is a side view of a meat aging room 100 indicating orientation of a combination fan and compressor 110 and a fan 112. In an embodiment, the compressor and fan 110 may be mounted to the ceiling and/or wall of the meat aging room 100. The compressor and fan 110 may substantially direct airflow 114 toward meat stored on a meat rack 102. The airflow 114 may be in line with the meat rack 102. In an embodiment, a fan 112 may be mounted proximate to an opposite side of the meat aging room 100 from the compressor and fan 100. For example, a fan 112 may be mounted to another side of the meat aging room 100 opposite from the side of the room 100 that the compressor and fan 110 is mounted. In an embodiment, a compressor and fan 100 is orientated closer to the floor of the meat room 100 than the ceiling of the meat room 100.

The fan 112 may direct airflow 116 towards the compressor and fan 110. In an embodiment, the airflow 114 controlled for temperature and/or humidity by the compressor and fan 110 is directed to be below the return airflow 116 from the fan 112. In some embodiments, the fan 112 is orientated below a height of the compressor and fan 110 such that the airflow 114 from the compressor and fan 110 is directed to be above the return airflow 116 from the fan 112. A fan 112A may be situated in a corner of the meat aging room 100 while a fan 112B may be orientated in an opposing corner and along the same side of the meat aging room 100 in which the fan 112A is situated.

The airflow 114 may be directed by the compressor and fan 110 to flow substantially along a central path of the meat aging room 100. Return airflow 116 may be directed by one or more fans 112 to flow substantially along a perimeter path of the meat aging room 100. In an embodiment, airflow 114 is directed along a lateral central path within meat aging room 100 while return airflow 116 is direct along an opposing lateral path along a perimeter of meat aging room 100. In an embodiment, a fan 112 is orientated opposite of the compressor and fan 110 such that the airflow 114 is substantially along the same lateral path as airflow 116 though at a different height than airflow 116.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A process for dry aging meat, comprising:
providing an enclosed, temperature and humidity controlled aging room having a pair of spaced apart longer length walls each with a height, a pair of spaced apart shorter width walls each with the same height, a floor and a ceiling, enclosing a volume for containing an aging atmosphere;
controlling the temperature and the humidity of the aging atmosphere in the aging room to be within selected temperature and humidity ranges;
providing along a substantial portion of the length and height of one of the length walls, a salt rack carrying an ordered stack of a multiplicity of salt bricks, the salt rack orientated from the one length wall to allow circulation of the atmosphere around the salt bricks;
providing a plurality of meat racks in the aging room, spaces between the stack of bricks and the other one of the length walls, the meat racks being arranged around the aging room in a respective plurality of aging locations from remote locations spaced furthest from the salt rack, to intermediate locations that are closer to the salt rack, to proximal locations that are along the salt rack;
providing along a central width of the aging room, a plurality of ultra-violet (UV) lights arranged in a row, wherein at least one of the UV lights produces ozone and is adjacent to another UV light not producing ozone, wherein the plurality of UV lights arranged in a row is stacked vertically above an additional row of UV lights to form an alternating grid arrangement of UV lights producing ozone and UV lights not producing ozone thereby causing ozone to be circulated in a controlled pattern; and circulating the atmosphere in the aging room around the meat racks and the salt racks by a plurality of fans, wherein the plurality of fans are arranged about the aging room such that:

a first set of fans comprising a compressor and one or more fans, located along a lateral central path on a first width of the aging room and away from either corner of the aging room along the first width, induces a first airflow toward at least one meat rack and along a lateral central path of the aging room, the first airflow being humidity adjusted from a compressor, directed at a first height in-line with a length of the at least one meat rack; and a second set of fans, orientated on a second width wall of the meat aging room opposite from the first width and the first set of fans, each fan of the second set of fans located substantially in a corner of the meat aging room along the second width and away from a central position on the second width, induces a return airflow of the first airflow at a second height different from the first airflow and substantially along a perimeter path of the aging room exclusive from the central path.

2. The dry aging meat process of claim 1, wherein each individual meat rack of the plurality of meat racks includes an antimicrobial coating.

3. The dry aging meat process of claim 1, wherein the humidity range is maintained between approximately 60%-61%.

4. The dry aging meat process of claim 1, wherein the temperature range is maintained between approximately 32 degrees Fahrenheit and 35 degrees Fahrenheit.

5. The dry aging meat process of claim 1, wherein the first set of fans are located along a side of the aging room that intersects another side of the aging room parallel to the salt rack.

6. The dry aging meat process of claim 1, wherein the plurality of UV lights are located at a height corresponding to a lowest meat rack of the plurality of meat racks and the height extends to a second height corresponding to a highest meat rack of the plurality of meat racks.

* * * * *